United States Patent Office 3,404,176
Patented Oct. 1, 1968

3,404,176
PROCESS FOR DIRECT PREPARATION OF ALPHA-KETO ESTERS
Paul E. Burton, Westfield, and Herbert K. Wiese, Cranford, N.J., assignors to Esso Research and Engineering Company, a corporation of Delaware
No Drawing. Filed Jan. 27, 1965, Ser. No. 428,534
26 Claims. (Cl. 260—497)

ABSTRACT OF THE DISCLOSURE

A one-step process for the preparation of alpha-keto alkyl esters comprising reacting a Type II or IV olefin with a nitrosating agent and a carboxylic acid reactant consisting of either carboxylic acids, carboxylic acid anhydrides, or mixtures thereof in the presence of a strong acid catalyst. The process is conducted most efficiently at pressures ranging from 1 to 75 atmospheres and at temperatures in the range of from about $-10$ to $100°$. Preferably, monocarboxylic acids and monoolefins are used.

---

This invention relates to a process for the preparation of alpha-keto alkyl esters from olefinic hydrocarbons. More specifically, it relates to the direct preparation of alpha-keto alkyl esters by reacting a Type II, or IV olefin with a nitrosating agent and a normal aliphatic monocarboxylic acid or its anhydride in the presence of a catalytic amount of a strong acid.

Keto alkyl esters find utility as solvents, especially as solvents for epoxy and vinyl resins. Thus while such compositions are highly desirable, present methods for producing keto alkyl esters have certain disadvantages, for example, the methods either involve a multiple of steps or use expensive reagents. For example ethyl oxaloacetate is prepared by a crossed Claisen type condensation using ethyl oxalate, ethyl acetate, and sodium ethylate. Another method involves using expensive acetylenic carbinols as starting materials. These acetylenic carbinols are converted to keto alkyl esters by a reaction also involving a multiple of steps. In the first step the acetylenic carbinols are hydrated to hydroxy ketones which are subsequently esterified in a second step with a carboxylic acid or acid anhydride. Still another expensive method involves the reaction of ketones, particularly cyclic ketones, with mercuric acetate.

It has now been found that alpha-keto alkyl esters can be advantageously prepared in one step by the reaction of Type II or IV olefins, as defined herein, with a nitrosetting agent and a carboxylic acid reactant and/or its anhydride in the presence of an acid catalyst. The following chemical equation is representative of the reaction of the present invention and describes the reaction of 2-methyl-2-butene with methyl nitrite in acetic acid with sulfuric acid as catalyst:

(I)

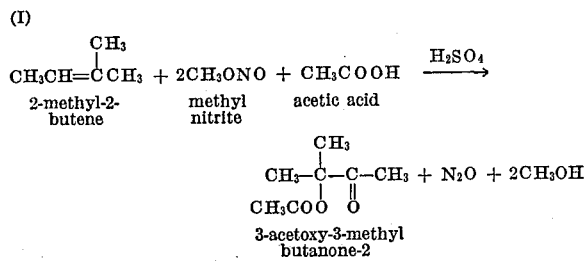

While the above equation represents the overall reaction contemplated in this invention, there are actually several reactions involved. These are illustrated below with 2-methyl-2-butene, methyl nitrite, and acetic acid as reactants and sulfuric acid as the catalyst.

(II)

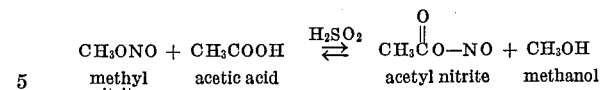

(III)

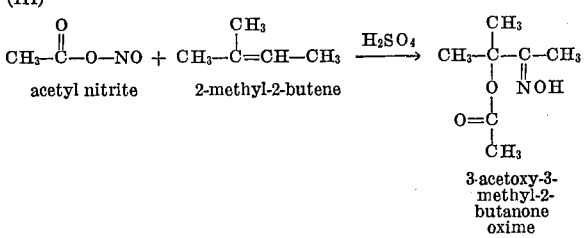

(IV)

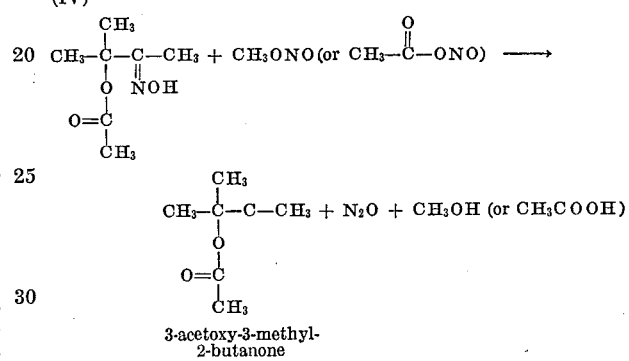

(V)

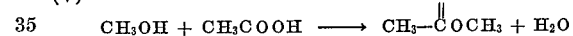

An alternative way of producing an acid nitrite as illustrated in the above Equation II by the formation of acetyl nitrite from acetic acid and methyl nitrite is by the reaction of a nitrosating agent with a carboxylic acid anhydride. For example, with acetic anhydride and methyl nitrate the reaction is as follows:

(VI)

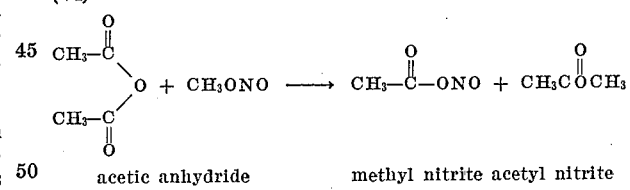

acetic anhydride    methyl nitrite  acetyl nitrite

Thus, it is possible to obtain the same end-product, i.e., alpha-keto esters, as claimed in this invention, by using either a carboxylic acid, a carboxylic acid anhydride or a combination of the two. Utilization of a mixture of carboxylic acid and carboxylic acid anhydride in the reaction is generally preferred, however because it advantageously improves the yield of alpha-keto esters. This may be attributable to the fact that when an alkyl nitrite is used as the nitrosating agent, the carboxylic acid anhydride reacts with the alcohol to produce an ester and thus shift the equilibrium of the reaction shown by Equation II to the acid nitrite side. Appreciable quantities of alkyl nitrite present in the reaction are undesirable inasmuch as a side reaction may occur which results in a loss of nitrosating agent. Such side reaction involves an oxidative double bond cleavage of the olefin to carbonyl compounds wherein the nitrosating agent, particularly an alkyl nitrite, acts as the oxidizing agent. The presence of a carboxylic acid anhydride can also be important from a standpoint of reacting with any water present or produced during the reaction. The removal of water by reaction with a carboxylic acid anhydride prevents the loss of acid nitrite according to the following equations:

(VII)
$$2R-\overset{O}{\underset{\|}{C}}-ONO + H_2O \rightleftarrows 2R\overset{O}{\underset{\|}{C}}OH + N_2O_3$$

(VIII)
$$N_2O_3 \rightleftarrows NO + NO_2$$

The alpha-oximino alkyl ester shown by Equation III, e.g., 3-acetoxy-3-methyl-2-butanone oxime, is an intermediate in the reaction and may be isolated in varying amounts depending on the ratio of olefin and nitrosating agent employed and upon the reaction conditions. The alpha-oximino alkyl ester may be converted to the corresponding alpha-keto alkyl ester by reaction with a nitrosating agent, as shown in Equation IV or by suitable hydrolysis.

The terms Type II and IV olefins as employed herein refer to aliphatic olefins, as well as monocyclic and polycyclic olefins. The position and number of substituents of the aliphatic Type II and IV olefins contemplated herein are the same as indicated by C. E. Boord, The Science of Petroleum, volume 2, page 1349 et seq., Oxford University Press, New York (1938). The definition of the aliphatic, monocyclic and polycyclic Type II and IV olefins, is presented below.

|  | Aliphatic | Monocyclic and polycyclic |
|---|---|---|
| Type II | $R-\overset{H}{\underset{\|}{C}}=\overset{H}{\underset{\|}{C}}-R'$ | $Y\begin{matrix}C-H\\ \|\|\\ C-H\end{matrix}$ |
| Type IV | $R-\overset{R'}{\underset{\|}{C}}=\overset{H}{\underset{\|}{C}}-R''$ | $Y\begin{matrix}C-Z\\ \|\|\\ C-H\end{matrix}$ |

With regard to the aliphatic olefins suitably employed, each of R, R' and R" may be an alkyl, alkenyl, cycloalkyl, aralkyl, aralkenyl, aryl, or alkaryl and each may be unsubstituted or inertly substituted, i.e., possess substituents which are inert to the reactions contemplated by this invention. Thus, when R, R' or R" represents alkyl, the alkyl group may be a straight or branched chain alkyl group. Moreover, said alkyl group may contain a cycloalkyl moiety in addition to its straight or branched chain moiety. In the case of the Type II and IV monoolefins, each R, R' and R" group may contain from 1 to 18 carbon atoms, and preferably from 1 to 10 carbon atoms. In cases where one or more of the R, R' and R" groups is aralkyl, the alkyl moiety thereof is usually unsubstituted and contains from 1 to 12 carbon atoms.

With regard to the monocyclic and polycyclic Type II and IV olefins, the Y group represents the remaining part of the mono- or polycyclic ring system. For example, in the instance of 1-methyl-1-cyclopentene, the Y group is $(CH_2)_3$. The Y group may contain from 1 to 16 carbon atoms for a monocyclic ring system and from 3 to 20 carbon atoms for a polycyclic ring system. The Z substituent of the monocyclic and polycyclic Type IV olefins is the same as defined hereinabove for the R, R' and R" substituents of the aliphatic Type II and IV olefins. It is also contemplated herein that the same R, R' and R" substituents listed for the aliphatic olefins may also be substituents on the Y group of the mono- and polycyclic olefins.

The olefins suitably employed herein may be monoolefinically unsaturated or polyolefinically unsaturated, cyclic or acyclic.

The following Type II and IV olefins are exemplary of those which may be employed in accordance with this invention. These olefins include, but are not limited to the following:

Cyclohexene; cyclohexadiene; dicyclopentadiene; dimer of methylcyclopentadiene, dicyclohexadiene; butene-2; pentene-2; 2-methyl-2-butene; 2-methyl-2-pentene; 3-methyl-2-pentene; 1-methyl-1-cyclopentene; 1-methyl-1-cyclohexene; olefin fractions containing any one or more of these olefins; polymers containing Type II or IV double bonds, such as natural rubber, butyl rubber, etc. Also olefin derivatives may be employed which form Type II or IV olefins under the acidic reaction conditions employed herein, and thus the olefin may be formed in situ. For example, tertiary ethers, carboxylic esters, or alcohols derived from Type IV olefins are converted under acidic conditions to unsaturated hydrocarbons, e.g. according to the following equation:

$$R-\overset{R'}{\underset{\underset{R'''}{\overset{\|}{O}}}{\overset{\|}{C}}}-\overset{H}{\underset{\|}{C}}-R'' \xrightarrow{H^+} R-\overset{R'}{\underset{\|}{C}}=\overset{H}{\underset{\|}{C}}-R'' + R'''OH$$

The nitrosating agents found suitable for use in accordance with the method of this invention are well known in the art and, for example, include those oxides of nitrogen capable of forming nitrosyl sulfuric acid. Non-limiting examples of such oxides include nitrosyl sulfuric acid, $N_2O_3$, $NO+air$, and organic nitrates of the formula A—ONO, wherein A is an alkyl, alkenyl, cycloalkyl, cycloalkenyl, aralkyl or aralkenyl radical. In addition to containing carbon and hydrogen, the A radical may also contain oxygen, halogen and sulfur as inert substituents. When A is alkyl or aralkyl, the alkyl moiety may either be straight chain or branched chain. When A is cycloalkyl or cycloalkenyl, the cycloalkyl or cycloalkenyl moiety may be unsubstituted or may contain alkyl or aryl substituents. The organic nitrites may contain from 1 to 20 carbon atoms and preferably contain from 1 to 16 carbon atoms.

Non-limiting examples of organic nitrites include the following: benzyl nitrite; methyl nitrite; isoamyl nitrite; ethyl nitrite; n-amyl nitrite; isopropyl nitrite; tert-butyl nitrite; cyclohexyl nitrite; 2-methyl-2-ethyl butyl nitrite; ethylene glycol mono- and dinitrites; 2-ethoxy ethyl nitrite; allyl nitrite; etc.

The nitrosating agent may also be prepared in situ by reaction of a nitrite salt, for example, sodium nitrite, with an acid such as sulfuric acid.

It has been found that 2 moles of the said nitrosating agent are required per mole of ethylenic unsaturation in said olefinic material converted to alpha-keto alkyl ester. About 0.1 to 2 moles of said nitrosating agent per mole of ethylenic unsaturation in said olefinic material are suitably employed, with about from 0.5 to 1.0 mole of said agent being preferably employed.

In accordance with the invention, the acid reactant suitably used herein may be defined as a monocarboxylic acid or corresponding anhydride of the formula R—COOH or $$R\overset{O}{\underset{\|}{C}}-O\overset{O}{\underset{\|}{C}}-R$$

wherein R is an alkyl, cycloalkyl, aryl or aralkyl radical. In addition to containing carbon and hydrogen, the R radical may also contain oxygen, one or more halogen and/or sulfur as inert substituents. When R is cycloalkyl, the cycloalkyl moiety may be unsubstituted or may contain alkyl or aryl substituents. The organic acid or anhydride contains from 1 to 20 carbon atoms and preferably contains from 1 to 6 carbon atoms.

The carboxylic acids and anhydrides suitably employed include, but are not limited to, formic acid; acetic acid; acetic anhydride; propionic acid; propionic anhydride, butyric acid; butyric anhydride; isobutyric acid; isobutyric anhydride; benzoic acid; benzoic anhydride; trifluoroacetic acid; trifluoroacetic anhydride; etc.

Accordingly, from about 1 to 25 moles of said acid reactant per mole of ethylenic unsaturation in said olefins are suitably employed, with from 1 to 10 moles of acid reactant per mole of ethylenic unsaturation being preferred.

In accordance with the process of this invention, any acid catalyst may be employed including acids classified as Lewis acids or Lowry-Bronsted acids. Suitable acid catalysts which may be employed in accordance with this invention include, but are not limited to, the following: sulfuric acid; alkyl acid sulfates, e.g., methyl hydrogen sulfate; potassium bisulfate; HF; alkyl acid sulfates plus HI, e.g. methyl hydrogen sulfate plus HI; sulfonated resins, e.g. sulfonated polystyrene resin; benzene mono-, di-, and tri-sulfonic acids; alkylated-, halogenated-, or nitrated-benzene sulfonic acids, zinc chloride; zinc bromide; zinc iodide; hydrochloric acid; hydrobromic acid; phosphoric acid; polyphosphoric acid; alkyl acid sulfates plus alkyl alkali metal sulfates, e.g. methyl hydrogen sulfate plus methyl sodium sulfate; $AlCl_3$; $BF_3$; $BCl_3$; $BF_3 \cdot (C_2H_5)_2O$;

$HF+BF_2$; $SbF_3$; $SnF_4$; $HCl+AlCl_3$; $SnF_4+HF$; $HgCl_2+HCl$; $BiCl_3+HCl$; $CuCl_2+HCl$; $CuBr_2+HBr$;

$FeCl_3$; acidic mixtures containing any two or more of the above mentioned acids; etc.

In this regard, it has been found that from about 0.01 to 1.0 mole of catalyst per mole of nitrosating agent employed suitably catalyzes this reaction. Preferably about 0.01 to 0.1 mole of catalyst per mole of nitrosating agent is used. When nitrosyl sulfuric acid is employed as the nitrosating agent it serves as its own catalyst.

In addition to the carboxylic acid or carboxylic acid anhydride, which may also function as a solvent in addition to its primary function, an additional solvent may be employed as the reaction medium. Thus, any volatilizable solvent which is liquid under the reaction conditions and which is resistant to the catalyst and the nitrosating agent employed, may be utilized herein. Non-limiting examples of solvents suitable for use herein include: paraffinic hydrocarbons, halogenated hydrocarbons, e.g., dichloromethane, hydrocarbon ethers, e.g., diethyl ether, halogenated acetic acid, liquid $SO_2$, nitrohydrocarbons, dimethyl sulfoxide, and the like.

The reaction of the present invention may be carried out at less than atmospheric, atmospheric or at superatmospheric pressure, depending upon the other conditions of operation. Thus, the operating pressure will depend on the particular olefin feed, as well as the other reactants employed. The preferred pressure utilized, however, ranges from about 1 up to about 75 atmospheres.

It is found that optimum results are obtained at reaction temperatures of from about −50° to about 200° C. Preferably, temperatures of from about −10° to about 100° C. are employed.

The proportions of the reactants employed are preferably chosen such that at least 1 mole of monocarboxylic acid or anhydride or preferably a mixture of both is present for each mole of ethylenic unsaturation present in the olefin hydrocarbon. When the monocarboxylic acid is also employed as the solvent, it follows that said acid is employed in much greater excess. When an inert solvent, in addition to the carboxylic acid is employed, the proportion of the solvent can be such as to constitute less than 1 to about 100 parts or more by volume for each part by weight of monocarboxylic acid, one part by volume being equivalent to the volume of one part by weight of water at the same temperature. It should be noted that although use of a solvent is preferred, the reaction may be carried out without employing a solvent.

The duration of the reaction depends upon the temperature, pressure, concentration of the reagents and varies over a wide range, hence the reaction period is not critical to the process of this invention.

In carrying out the process, the olefinic starting reactant and the monocarboxylic acid or anhydride or mixture of both are mixed together, preferably by slowly adding the acid to the olefin with proper stirring. Suitably, the acid catalyst is then added to the thus-mixed reactants with additional stirring so as to insure optimum absorption of the acid throughout the reaction mixture. Alternately, the olefin and the nitrosating agent are added simultaneously to the mixture of carboxylic acid and/or anhydride with the catalyst.

The nitrosating agent may be added after the acid catalyst has been admixed with the reactants or it can be added simultaneously with the acid catalyst. The reaction on which the instant invention is predicated then takes place and it is found that suitable reaction time periods range from about 1 up to about 600 minutes and preferably range from 1 up to about 120 minutes. As heretofore mentioned, however, such period is a function of the operating conditions employed, i.e., the specific olefin used, the acid-olefin ratio, temperature, pressure and the like and the required contact time period will, accordingly, vary with the conditions applied.

The chemical compounds formed in accordance with the invention are predictable from the olefin hydrocarbon and monocarboxylic acid employed as starting reactants. In order to illustrate this, the following Table I sets out the alphaketo alkyl esters produced in this way and the olefin hydrocarbons and monocarboxylic acids from which they were derived.

TABLE I

| Starting olefin | Starting acid | Keto alkyl ester product |
|---|---|---|
| (1) $H_3C-C=CCH_3$ with H H | $CH_3COOH$ | $CH_3CH-C-CH_3$ with $CH_3COO$ and $O$ |
| (2) $C_2H_5C=C-(C_2H_5)$ with H H | $CH_2COOH$ with $CH_3$ | $C_2H_5C-C-(C_2H_5)$ with $C_2H_5COO$ and $O$ |
| (3)  | $CH_3COOH$ | 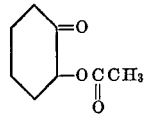 |
| (4) $CH_3C=C-CH_3$ with $CH_3$ and H | $CH_3COOH$ | $CH_3-C-C-CH_3$ with $CH_3$, $CH_3COO$, $O$ |
| (5) $CH_3C=C-(C_5H_{11})$ with $CH_3$H | $CH_3COOH$ | $CH_3-C-C-(C_5H_{11})$ with $CH_3$, $CH_3COO$, $O$ |
| (6)  | $CH_3COOH$ | 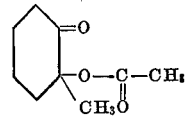 |

In order to recover the product resulting from the process of this invention, the acid catalyst is neutralized with a base, the solvent is removed by distillation, and the product, after separation by filtration from the salt of the catalyst acid, is purified by distillation or other suitable means.

Example I.—Preparation of
3-methyl-3-acetoxybutanone-2

Methyl nitrite (65 ml.) was added during 1.5 hours at 15–30° C. to a stirred solution of 70 g. 2-methyl-2-butene, 100 ml. acetic acid, 102 g. acetic anhydride and 38 g. methyl hydrogen sulfate. Upon completion of the addition, the methyl hydrogen sulfate was neutralized with sodium acetate, and the acetic acid and methyl acetate were separated from the product by distillation. The residue was filtered to remove sodium methyl sulfate and distilled yielding 31 g. of 3-methyl-3-acetoxybutanone-2 (B.P. 88–100° C./50 mm., $n_d^{20}$ 1.4238).

Example II.—Preparation of 3-acetoxybutanone-2

Butene-2 (90 ml.) and methyl nitrite (70 ml.) were added simultaneously during 3 hours at 25–36° C. to a stirred solution of 200 ml. acetic acid, 102 g. acetic anhydride, and 20 g. of sulfuric acid. Upon completion of the adidtion, one liter of pentane was added to the reaction mixture and a second phase appeared. After separation of the phases, the upper one was distilled yielding 20 g. of 3-acetoxybutanone-2 (B.P. 86–95° C./50 mm., $n_d^{20}$ 1.4126). Neutralization of the lower phase, followed by distillation gave an additional 4.1 g. of 3-acetoxybutanone-2.

Examples III–VII

In a manner similar to that of Examples I and II, a series of experiments was effected in order to illustrate further the process of this invention. The reactants, reaction conditions and product data are set forth below in tabular form in Table II.

It is to be understood that this invention is not limited to the specific examples which have been offered merely as illustrations and that modifications may be made without departing from the spirit of the invention.

keto alkyl esters which comprises contacting an olefinic hydrocarbon material selected from the group consisting of Type II and Type IV monoolefins having the formulas

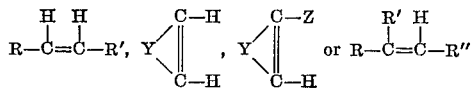

wherein each R, R', R", Y and Z is a hydrocarbon radical with from 0.1 to 2 moles of a nitrosating agent, selected from the group consisting of oxides of nitrogen and organic nitrites based on said olefinic material and from 1 to 25 moles of a carboxylic acid reactant selected from the group consisting of aliphatic monocarboxylic

TABLE II

| Example | Olefin | | | Acetic acid | Acetic anhydride | Nitrosating agent (moles) methyl nitrite [1] | Catalyst | |
|---|---|---|---|---|---|---|---|---|
| | Name | Moles | Type | (gms.) | (gms.) | | Name | Moles |
| III | Cyclohexene | 1.0 | II | 210 | 102 | 1.0 | H₂SO₄ | 0.25 |
| IV | 2-methyl-2-butene | 2.1 | IV | 525 | None | 2.0 | H₂SO₄ | 0.20 |
| V | do | 2.1 | IV | None | 540 | 2.0 | H₂SO₄ | 0.20 |
| VI | do | 1.0 | IV | 105 | 102 | 1.1 | CH₃SO₄H | 0.34 |
| VII | Butene-2 | 1.0 | II | 210 | 102 | 1.15 | H₂SO₄ | 0.20 |

| Example | Name | Temp. of Reaction (°C) | Time of Reaction (hrs.) | Alpha-keto alkyl ester (moles) | Alpha oximino Alkyl ester (moles) | Footnote |
|---|---|---|---|---|---|---|
| III | Cyclohexene | 20–33 | 2.4 | 0.024 | | |
| IV | 2-methyl-2-butene | 30–42 | 1.6 | 0.028 | 0.28 | (²) |
| V | do | 21–34 | 3.1 | 0.049 | 0.64 | |
| VI | do | 13–30 | 1.5 | 0.215 | 0.082 | (³) |
| VII | Butene-2 | 25–36 | 3.0 | 0.189 | 0.035 | |

[1] Two moles of nitrosating agent are required for each mole of alphaketo alkyl ester produced.
[2] 0.58 mole of the olefin was converted to cleavage products (acetone and acetaldehyde).
[3] 0.11 mole of the olefin was converted to cleavage products (acetone and acetaldehyde).

What is claimed is:

1. A process for the preparation of alpha-keto alkyl esters which comprises contacting an olefinic hydrocarbon material selected from the group consisting of Type II and Type IV olefins having the formulas

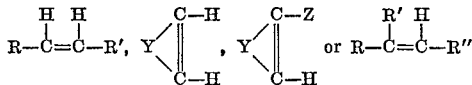

wherein each R, R', R", Y and Z is a hydrocarbon radical with a nitrosating agent selected from the group consisting of oxides of nitrogen and organic nitrites and an acid-reactant selected from the group consisting of carboxylic acids, carboxylic acid anhydrides, and mixtures thereof having the formula R—COOH and

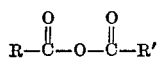

wherein R is an alkyl, cycloalkyl, aryl or arylalkyl radical of 1 to 20 carbon atoms in the presence of an acid-catalyst at a temperature ranging from about −50 to about 200° C.

2. The process of claim 1 in which from about 0.1 to 2 moles of nitrosating agent are employed per mole of ethylenic unsaturation in said olefinic material.

3. The process of claim 1 in which from 1 to 25 moles of said acid-reactant are employed per mole of ethylenic unsaturation present in said olefinic material.

4. The process of claim 1 in which from about 0.01 to 1.0 mole of said acid-catalyst is employed per mole of said nitrosating agent.

5. The process of claim 1 in which an inert volatile solvent is employed.

6. The process of claim 1 in which said process is carried out in the liquid phase at reaction temperatures of from about −50° to about 200° C. and for a reaction time period of from about 1 minute up to about 600 minutes.

7. A one step process for the preparation of alpha-keto alkyl esters which comprises contacting an olefinic hydrocarbon material selected from the group consisting of Type II and Type IV monoolefins having the formulas acids, aliphatic monocarboxylic acid anhydrides, and mixtures thereof having the formula RCOOH and

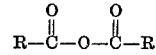

wherein R is an alkyl or cycloalkyl radical of 1–20 carbons per mole of ethylenic unsaturation of said olefinic material in the presence of from 0.01 to 1 mole of acid-catalyst per mole of said nitrosating agent, said process being effected in the liquid phase at a temperature in the range of from −50° to 200° C. for a reaction period from 1 minute up to about 600 minutes.

8. The process of claim 7 in which from 0.5 to 1 mole of said nitrosating agent is employed per mole of ethylenic unsaturation in said olefinic material.

9. The process of claim 8 in which from about 1 to 10 moles of carboxylic acid reactant are employed per mole of ethylenic unsaturation in said olefinic material.

10. The process of claim 9 in which from about 0.01 to 0.1 mole of acid catalyst per mole of nitrosating agent is employed.

11. The process of claim 10 in which from about 1 to about 100 parts by volume of an inert solvent are employed for each part by weight of carboxylic acid reactant utilized.

12. The process of claim 11 in which said process is effected in the liquid phase at a pressure from 1 up to about 75 atmospheres, at a reaction temperature of from about −10° to about 100° C. and for reaction periods of from 1 to about 120 minutes.

13. A process for the preparation of alpha-keto alkyl esters which comprises adding to an olefinic hydrocarbon material selected from the group consisting of Type II and Type IV monoolefins having the formulas

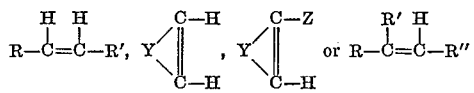

wherein each R, R', R", Y and Z is a hydrocarbon radical with an acid-reactant selected from the group consisting of aliphatic monocarboxylic acids, aliphatic monocarboxylic acid anhydrides, and mixtures thereof having the formula RCOOH and

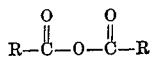

wherein R is an alkyl or cycloalkyl radical of 1–20 carbons while agitating the resulting mixture, adding an acid-catalyst to the thus-mixed reactants with additional stirring and adding a nitrosating agent selected from the group consisting of oxides of nitrogen and organic nitrites to mixture of reactants.

14. The process of claim 13 in which from 0.1 to 2 moles of said nitrosating agent are employed per mole of ethylenic unsaturation in said olefinic material.

15. The process of claim 13 in which from about 1 to 25 moles of acid-reactant are employed per mole of ethylenic unsaturation in said olefinic material.

16. The process of claim 13 in which from about 0.01 to 0.1 mole of mineral acid-catalyst per mole of nitrosating agent is employed.

17. The process of claim 13 in which from about 1 to about 100 parts by volume of an inert volatilizable solvent are employed for each part by weight of acid reactant utilized.

18. The process of claim 13 in which said process is effected in a liquid phase at a pressure from 1 up to about 75 atmospheres, at a reaction temperature of from about −50° to about 200° C. and for reaction periods of from 1 to about 120 minutes.

19. The process of claim 1 wherein said olefinic material is a monoolefin.

20. The process of claim 19 wherein said acid-reactant is one in which R is alkyl or cycloalkyl.

21. The process of claim 20 wherein said nitrosating agent is an organic nitrite having from 1 to 20 carbon atoms.

22. The process of claim 7 wherein said monolefins are compounds having the general formula selected from the group consisting of:

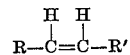

and

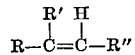

wherein R, R′, and R″ represent alkyl radicals having from 1 to 18 carbon atoms.

23. The process of claim 22 wherein R, R′ and R″ are alkyl radicals having from 1 to 10 carbon atoms.

24. The process of claim 23 wherein said carboxylic acid has from 1 to 6 carbon atoms.

25. The process of claim 22 wherein said nitrosating agent is an alkyl nitrite having from 1 to 16 carbon atoms.

26. The process of claim 22 wherein said acid catalyst is a mineral acid.

References Cited

UNITED STATES PATENTS 3,055,934    9/1962    Heisler et al. _____ 260—497

OTHER REFERENCES

Adams et al., Organic Reactions, vol. 7, 1953, p. 328.

LORRAINE A. WEINBERGER, *Primary Examiner.*

V. GARNER, *Assistant Examiner.*